(12) United States Patent
Kurosumi

(10) Patent No.: US 9,989,957 B2
(45) Date of Patent: Jun. 5, 2018

(54) CONTROLLER FOR CONTROLLING MACHINE TOOL HAVING CUTTING CONDITION CHANGE FUNCTION

(71) Applicant: FANUC Corporation, Yamanashi (JP)

(72) Inventor: Yasuhiko Kurosumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 210 days.

(21) Appl. No.: 14/946,705

(22) Filed: Nov. 19, 2015

(65) Prior Publication Data

US 2016/0147212 A1    May 26, 2016

(30) Foreign Application Priority Data

Nov. 26, 2014 (JP) .................................. 2014-238382

(51) Int. Cl.
| | |
|---|---|
| *G05B 19/416* | (2006.01) |
| *B23Q 15/08* | (2006.01) |
| *B23Q 15/12* | (2006.01) |
| *G05B 19/4065* | (2006.01) |

(52) U.S. Cl.
CPC ......... *G05B 19/4163* (2013.01); *B23Q 15/08* (2013.01); *B23Q 15/12* (2013.01); *G05B 19/4065* (2013.01); *G05B 19/4166* (2013.01); *G05B 2219/35178* (2013.01); *G05B 2219/36089* (2013.01); *G05B 2219/37355* (2013.01); *G05B 2219/45044* (2013.01); *G05B 2219/49077* (2013.01)

(58) Field of Classification Search
CPC ............ G05B 19/4163; G05B 19/4166; G05B 2219/35178; G05B 2219/37355; G05B 2219/37586; G05B 2219/49077; G05D 19/02; B23Q 15/08
See application file for complete search history.

(56) References Cited

U.S. PATENT DOCUMENTS

| | | | | |
|---|---|---|---|---|
| 3,715,938 | A | * | 2/1973 | Ledergerber ............. B23B 3/00 318/571 |
| 4,547,847 | A | * | 10/1985 | Olig ................... G05B 19/4163 318/561 |
| 5,827,020 | A | * | 10/1998 | Fujita ................ G05B 19/4163 318/571 |
| 5,831,407 | A | | 11/1998 | Ouchi et al. |

(Continued)

FOREIGN PATENT DOCUMENTS

| | | |
|---|---|---|
| JP | 7-295619 A | 11/1995 |
| JP | 2000-84794 A | 3/2000 |

(Continued)

OTHER PUBLICATIONS

Decision to Grant a Patent in JP Application No. 2014-238382 dated Jan. 31, 2017.

*Primary Examiner* — Crystal J Barnes-Bullock
(74) *Attorney, Agent, or Firm* — Hauptman Ham, LLP

(57) ABSTRACT

A controller for controlling a machine tool calculates a variation of a cutting load based on a changed rotational speed or feed rate of a tool in a machining program for machining a workpiece when the rotational speed or the feed rate is changed, and executes the machining program if the changed rotational speed and/or feed rate of the tool and/or the cutting load are within the ranges of predetermined upper and lower limit values.

7 Claims, 8 Drawing Sheets

(56) References Cited

U.S. PATENT DOCUMENTS

| | | | |
|---|---|---|---|
| 6,344,724 B1 * | 2/2002 | Kakino | G05B 19/404 |
| | | | 318/569 |
| 6,535,788 B1 | 3/2003 | Yoshida et al. | |
| 6,597,968 B2 * | 7/2003 | Matsumoto | G05B 19/4166 |
| | | | 700/170 |
| 7,206,657 B2 * | 4/2007 | Esterling | G05B 19/4065 |
| | | | 700/175 |
| 7,536,237 B2 * | 5/2009 | Esterling | B23Q 17/0961 |
| | | | 700/170 |
| 7,875,316 B2 * | 1/2011 | Okada | C22C 29/00 |
| | | | 427/348 |
| 8,529,173 B2 * | 9/2013 | Hoefler | B23C 5/003 |
| | | | 408/143 |
| 9,517,547 B2 * | 12/2016 | Kasashima | B24D 5/02 |
| 9,527,141 B2 * | 12/2016 | Inagaki | B23B 27/1603 |
| 2016/0147212 A1 | 5/2016 | Kurosumi | |

FOREIGN PATENT DOCUMENTS

| | | | | |
|---|---|---|---|---|
| JP | 2001216011 A | * | 8/2001 | ......... G05B 19/4166 |
| JP | 2003-345408 A | | 12/2003 | |
| JP | 2005-205517 A | | 8/2005 | |
| JP | 2005205517 A | * | 8/2005 | |
| JP | 2007-94458 A | | 4/2007 | |
| JP | 2008-134813 A | | 6/2008 | |
| JP | 2015-184687 A | | 10/2015 | |
| JP | 2016-97491 A | | 5/2016 | |
| WO | WO 2016199591 A1 | * | 12/2016 | ............. B23Q 15/08 |

* cited by examiner

CONTROLLER FOR CONTROLLING MACHINE TOOL HAVING CUTTING CONDITION CHANGE FUNCTION

RELATED APPLICATIONS

The present application claims priority to Japanese Application Number 2014-238382, filed Nov. 26, 2014, the disclosure of which are hereby incorporated by reference herein in its entirety.

BACKGROUND OF THE INVENTION

Field of the Invention

The present invention relates to a controller for controlling a machine tool, and more particularly, to a controller for controlling a machine tool having a function of automatically changing cutting conditions.

Description of the Related Art

In cutting a workpiece using a machine tool, a tool rotational speed and a cutting feed rate in a machining program may sometimes be modified to change cutting conditions depending on the situation. In many of sophisticated machining programs, tool rotational speeds and cutting feed rates are designated individually in a great many spots, and it is very troublesome to manually modify all these factors. Further, it is very time-consuming to determine whether or not the changed cutting conditions are appropriate or whether conditions including a cutting load are within appropriate ranges or not.

Japanese Patent Applications Laid-Open Nos. 2000-84794 and 2007-94458 are examples of prior art documents related to automatic change of cutting conditions.

In a conventional machine tool, the cutting feed rate for actual machining can be changed relative to a rate set in a machining program by changing the override setting of the cutting feed rate by means of a rotary switch or the like. The rotational speed of a tool can be changed in the same manner.

In most cases, however, the setting of this type is uniformly applied to the entire machining program. If the change is desired to be applied for each tool by any means, an operator is expected to wait in front of an indicator of the machine tool and manually change the override setting on each occasion.

On the other hand, Japanese Patent Application Laid-Open No. 2000-84794 for the execution of the automatic change of cutting conditions is premised on an automatic change for optimal cutting conditions and does not prescribe deliberate automatic change of cutting conditions within appropriate ranges. This technique cannot comply with a request to, for example, 'slightly lower the cutting conditions to extend the tool life, although the current cutting conditions have any special troubles'.

According to the technique disclosed in Japanese Patent Application Laid-Open No. 2007-94458, moreover, it cannot be determined whether the changed cutting conditions are appropriate or not, although the above request can be met. Further, this technique relates to the cutting feed rate only and cannot deal with cutting condition changes in accordance with the rotational speed of a spindle and an actual cutting load.

SUMMARY OF THE INVENTION

Accordingly, an object of the present invention is to provide a controller for controlling a machine tool having a function of automatically changing a cutting condition.

The present invention relates to a controller for a machine tool, which machines a workpiece according to a machining program. The controller includes: a tool cutting condition setting unit configured to set respective upper and lower limit values of a rotational speed, a feed rate, and a cutting load of a tool used in machining; a change condition setting unit configured to set a range and condition for changing the rotational speed and/or the feed rate of the tool in the machining program; a load calculation unit configured to calculate the cutting load from a variation between the cutting condition of the machining program before the change and the cutting condition of the machining program after the change; and a determination unit configured to determine whether or not at least one of the changed rotational speed, feed rate and calculated cutting load is within the ranges of the respective upper and lower limit values of the rotational speed, the feed rate, and the cutting load set by the tool cutting condition setting unit.

The controller may be configured to execute the machining program if it is determined by the determination unit that the rotational speed or the feed rate of the tool changed by the change condition setting unit and the cutting load calculated by the load calculation unit are within the ranges of the respective upper and lower limit values of the rotational speed, the feed rate, and the cutting load set by the tool cutting condition setting unit.

The controller may further include a display unit configured to display the result of the determination by the determination unit.

According to the present invention, there can be provided a controller for controlling a machine tool having a function of automatically changing cutting conditions.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

In the present invention, a machine tool is given a function of automatically changing a cutting condition according to Procedures 1 to 6 shown in Table 1 below. Table 1 shows operation procedures for automatic change of the cutting condition according to the present invention.

TABLE 1

| |
|---|
| Procedure 1: Execution of the cutting condition is considered (executor: operator or production line manager). |
| Procedure 2: Upper and lower limit values of the cutting condition for each tool are input (executor: operator or production line manager). |
| Procedure 3: Conditions for the automatic change of the cutting condition are set (executor: operator or production line manager). |
| Procedure 4: A machining program is started (executor: operator, production line manager, or external device of machine tool). |
| Procedure 5: The change of the cutting condition is applied to the running machining program according to the contents of cutting (including determination on whether or not the changed cutting condition complies with a set condition) (executor: machine tool (automatic execution)). |
| Procedure 6: The machining program is stopped (executor: machine tool (automatic execution)). |

The following is a description of detailed examples of the procedures in Table 1.

<Procedure 1> Propriety of Cutting Condition Change

An operator or production line manager determines whether or not to change the cutting condition for the current machining program.

<Procedure 2> Input of Upper and Lower Limit Values of Cutting Condition for Each Tool The operator or production line manager inputs the upper and lower limit values of the cutting condition for each tool to the tool used in cutting work to be performed. The machine tool should be provided with input means for these values and means for storing the input values.

Figure 1:
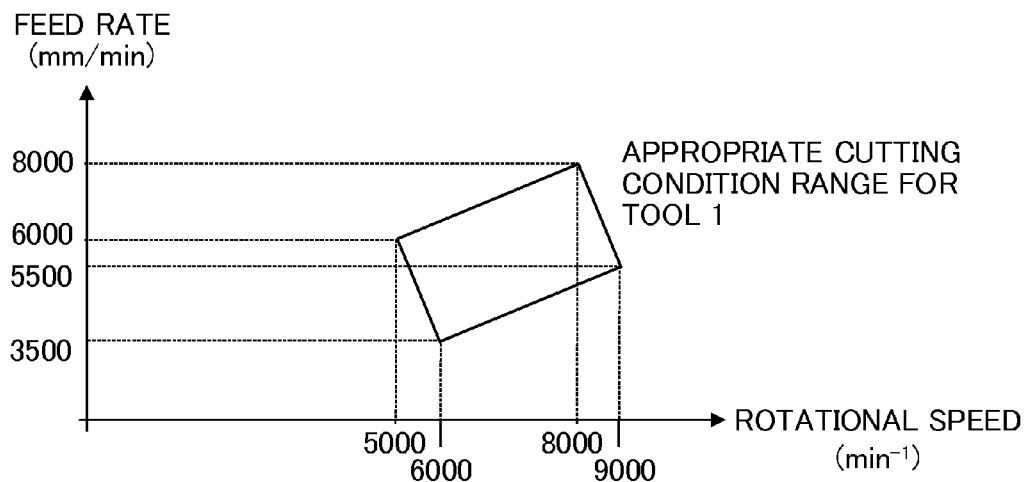
FIG. 1 is a diagram showing an example of designation of a cutting condition range for an arbitrary tool (Tool 1)

The input means comprises means configured to manually or automatically input contents of, for example, Table 2. Table 2 shows examples of input items for the upper and lower limit values of the cutting condition for each tool. Table 2 may be replaced with polygonal means, such as that shown in FIG. 1, for graphically displaying and designating a cutting condition range. FIG. 1 is a diagram showing an example of the designation of the cutting condition range for an arbitrary tool (Tool 1).

TABLE 2

| Tool No. | cutting condition | upper limit value | lower limit value |
|---|---|---|---|
| T1 | Tool rotational speed | 10000 min$^{-1}$ | 9000 min$^{-1}$ |
| | Feed rate | 6000 mm/min | 5000 mm/min |
| | Cutting load | 120% | 80% |
| T2 | Tool rotational speed | 6000 min$^{-1}$ | 5000 min$^{-1}$ |
| | Feed rate | 4000 mm/min | 3500 mm/min |
| | Cutting load | 150% | 90% |

Further, in the above description, "tool rotational speed" and "feed rate" specifically designated in the machining program are presented as examples of conditions to be input. Alternatively, however, "peripheral speed of tool rotation", "depth of cut per tool blade", and the like may be given by way of example. In this case, it is advisable to provide means capable of suitably carrying out conversion in the machine tool to determine the cutting condition using thus converted "tool rotational speed" and "feed rate".

These conditions may be input manually or by means capable of automatically inputting the cutting condition range when a model number or control number of the tool concerned is designated from a database previously provided in the machine tool.

In some cases, moreover, the upper and lower limit values for each tool may vary depending on the material to be cut and the type of machining (rough or finish). Therefore, a plurality of upper limit values and a plurality of lower limit values may be allowed to be set for each tool so that they can be changed according to the material.

Furthermore, an upper or lower limit value is expected to be also set for a cutting load, as well as for the tool rotational speed and the feed rate. Although the upper limit value can be singly set without a problem, it is anticipated that the cutting load will be greatly reduced if the tool is completely broken and disengaged and ceases to contact a workpiece. Thus, the complete breakage and disengagement of the tool, for example, can be estimated to some degree by providing the lower limit value.

For example, the following means may be used to calculate the cutting load.

Means 1: Automatic Calculation Based on Variations of Spindle Speed and Cutting Feed Rate If the spindle speed is increased in an appropriate condition range, the cutting load decreases in inverse proportion to it. If the cutting feed rate is increased, in contrast, the cutting load increases in proportion to it. Thus, the variation/change rate of the cutting load can be estimated by automatic calculation based on variations of the tool rotational speed and cutting feed rate.

Means 2: Change of Current Flowing Through Tool Rotation Motor (Spindle Motor) and Feed Axis Motor During Cutting In general, if cutting conditions are raised or if a tool or cutter is chipped and worn, necessary cutting power tends to increase for both tool rotation and axis feed. Current flowing through a tool rotation motor and a feed axis motor is increased to output necessary power for cutting. Thus, the cutting load is estimated by determining the degree of change of current during cutting, based on, for example, "motor rated current" or "motor current for cutting with unchipped tool" as a reference value stored in advance. If the cutting current exceeds the reference value, then it indicates that the load is increased. If the cutting current falls below the reference value, in contrast, then it indicates that the load is reduced.

The motor current value may be measured by additionally using a current sensor or read through communication with a controller for the spindle motor or the feed axis motor. For a conventional machine tool, the latter method is preferable because of no use of an additional device.

Means 3: Change of Power Consumption for Tool Rotation Motor (Spindle Motor) and Feed Axis Motor during cutting Means 3 differs from Means 2 only in that power consumption is used in place of the motor current. Specifically, the cutting load is estimated by determining the degree of change of power consumption during cutting, based on, for example, "motor rated power consumption" or "power consumption for cutting with unchipped tool" which is stored as a reference value in advance. Means for measuring the power consumption is also supposed to comply with Means 2.

Means 4: Change of Sound Pressure Level and Frequency Response of Sound Produced During Cutting In general, if cutting conditions are raised or if a tool or cutter is chipped and worn, the sound pressure level of sound produced during machining increases as the load increases. Consequently, the frequency response changes in many cases.

By way of example, the cutting load is estimated by comparing the sound pressure level or the frequency response during cutting with "volume and frequency response of sound produced when cutting is performed without chipping or wear of tool" which are stored as reference values in advance. The cutting load may be estimated from the change of the sound pressure level only. If the change of the frequency response is also examined in advance, however, it can be estimated that the cutting has been subjected to some change factors when "the frequency response has changed without any change of the sound pressure level".

A microphone or the like may be installed as the measuring means. Further, the controller should be provided inside with processing means for performing arithmetic processing for analysis of the sound pressure level and frequency response, storage, and comparison.

Means 5: Change of Level and Frequency Response of Mechanical Vibration Produced During Cutting Mechanical vibration is used in place of the sound used in Means 4. Specifically, "level and frequency response of mechanical vibration produced during cutting without chipping or wear of tool" are stored, for example, as reference values, and the level or frequency response of the mechanical vibration during cutting is compared with its corresponding reference value. Preferably, the frequency response is used as an auxiliary decision criterion, and the main decision is made based on the change of the vibration level. A vibration meter or the like may be installed as the measuring means.

The calculation of the cutting load is not limited to the execution of Means 1 to 5 described above. According to Means 4 and 5, however, variations can be considered to depend also on some other factor than machining conditions. Preferably, therefore, Means 4 and 5 should be used in combination with any of Means 1 to 3 instead of being used singly.

In the case of Means 1, it can be determined whether or not the machining load is within an appropriate range before the execution of cutting, that is, trial machining need not be performed. In the cases of Means 2 to 5, in contrast, trial machining (test machining) is practically indispensable.

<Procedure 3> Automatic Change Condition Setting for a Cutting Condition

The operator or production line manager conducts studies on how to automatically change a cutting condition set in the current machining program and then carries out setting. The machine tool should be provided with input means and storage means for these settings. Tables 3 and 4 show examples of the settings. Table 3 shows an input item example 1 for cutting condition change contents for each tool. Table 4 shows an input item example 2 for the cutting condition change contents for each tool.

TABLE 3

A. Cutting condition automatic change function (setting of Condition 1)
A1: Setting of scope of application (selection of any of (1) to (3) below)
(1) Application to entire machining program
(2) Application to only designated range of machining program
(3) No application
A2: Tool rotational speed (selection of any of (1) to (3) below; values '○' or '□' is input if (2) or (3) is selected)
(1) No change
(2) Increase by ○%
(3) Reduction by □%
A3: Cutting speed (selection of any of (1) to (3); values '○' or '□' is input if (2) or (3) is selected)
(1) No change
(2) Increase by ○%
(3) Reduction by □%
B. Cutting condition automatic change function (setting of Condition 2)
B1: Setting of scope of application (selection of any of (1) to (3))
(1) Application to entire machining program
(2) Application to only designated range of machining program
(3) No application
B2: Tool rotational speed (selection of any of (1) to (3); values '○' or '□' is input if (2) or (3) is selected)
(1) No change
(2) Increase by ○%
(3) Reduction by □%
B3: Cutting speed (selection of any of (1) to (3); values '○' or '□' is input if (2) or (3) is selected)
(1) No change
(2) Increase by ○%
(3) Reduction by □%
C. . . .
.
.
.

TABLE 4

A. Cutting condition automatic change function (setting of Condition 1)
A1: Setting of scope of application (selection of any of (1) to (3))
(1) Application to entire machining program
(2) Application to only designated range of machining program
(3) No application
A2: Tool rotational speed (selection of any of (1) to (3); values '○' or '□' is input if (2) or (3) is selected)
(1) No change
(2) Increase by ○ $min^{-1}$
(3) Reduction by □ $min^{-1}$
A3: Cutting speed (selection of any of (1) to (3); values '○' or '□' is input if (2) or (3) is selected)
(1) No change
(2) Increase by ○ $min^{-1}$
(3) Reduction by □ $min^{-1}$
B. Cutting condition automatic change function (setting of Condition 2)
B1: Setting of scope of application (selection of any of (1) to (3))
(1) Application to entire machining program
(2) Application to only designated range of machining program
(3) No application
B2: Tool rotational speed (selection of any of (1) to (3); values '○' or '□' is input if (2) or (3) is selected)
(1) No change
(2) Increase by ○ $min^{-1}$
(3) Reduction by □ $min^{-1}$ TABLE 4-continued B3: Cutting speed (selection of any of (1) to (3);
values '○' or '□' is input if (2) or (3) is selected)
(1) No change
(2) Increase by ○ min$^{-1}$
(3) Reduction by □ min$^{-1}$
C. . . .
.
.
.

As in the case of Procedure 2, these input forms, input contents, and input means are not particularly limited.

Figure 2:
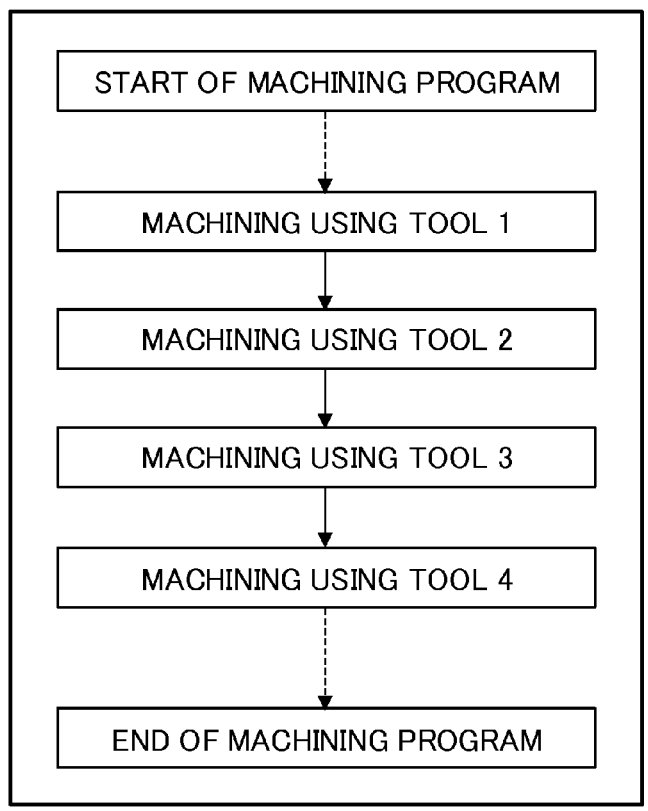
FIG. 2 is a schematic diagram showing an example of a machining program.

The following is a supplementary explanation of "setting of scope of application" in Tables 3 and 4, based on illustration of an application example. The block diagram of FIG. 2 shows an outline of the machining program.

Figure 3:
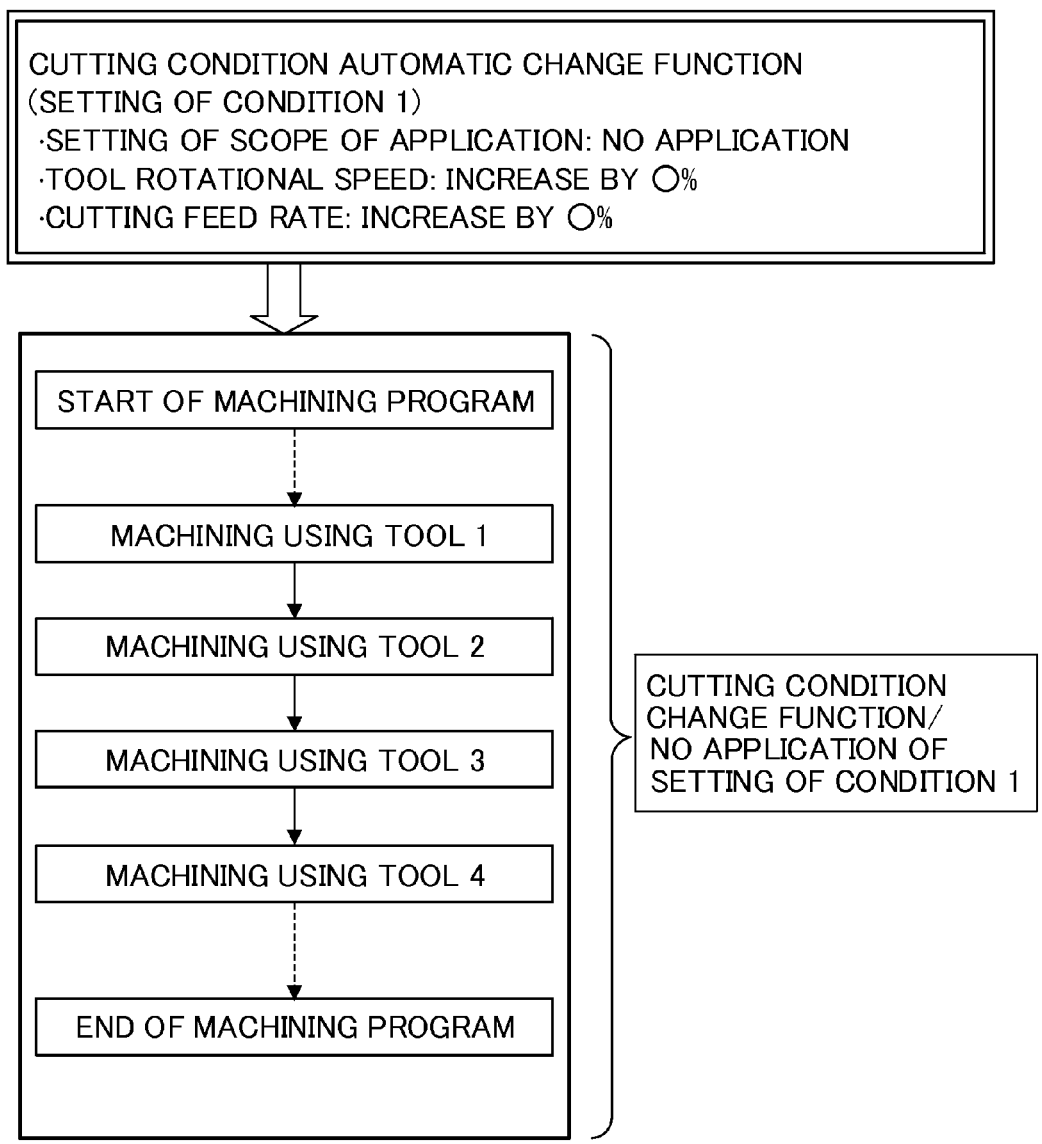
FIG. 3 is a diagram showing an example in which cutting conditions are not automatically changed for the entire machining program.

If "(3) No application" in "setting of scope of application" is selected, no change is applied even though change conditions such as the tool rotational speed and the cutting feed rate are set (see FIG. 3).

Figure 4:
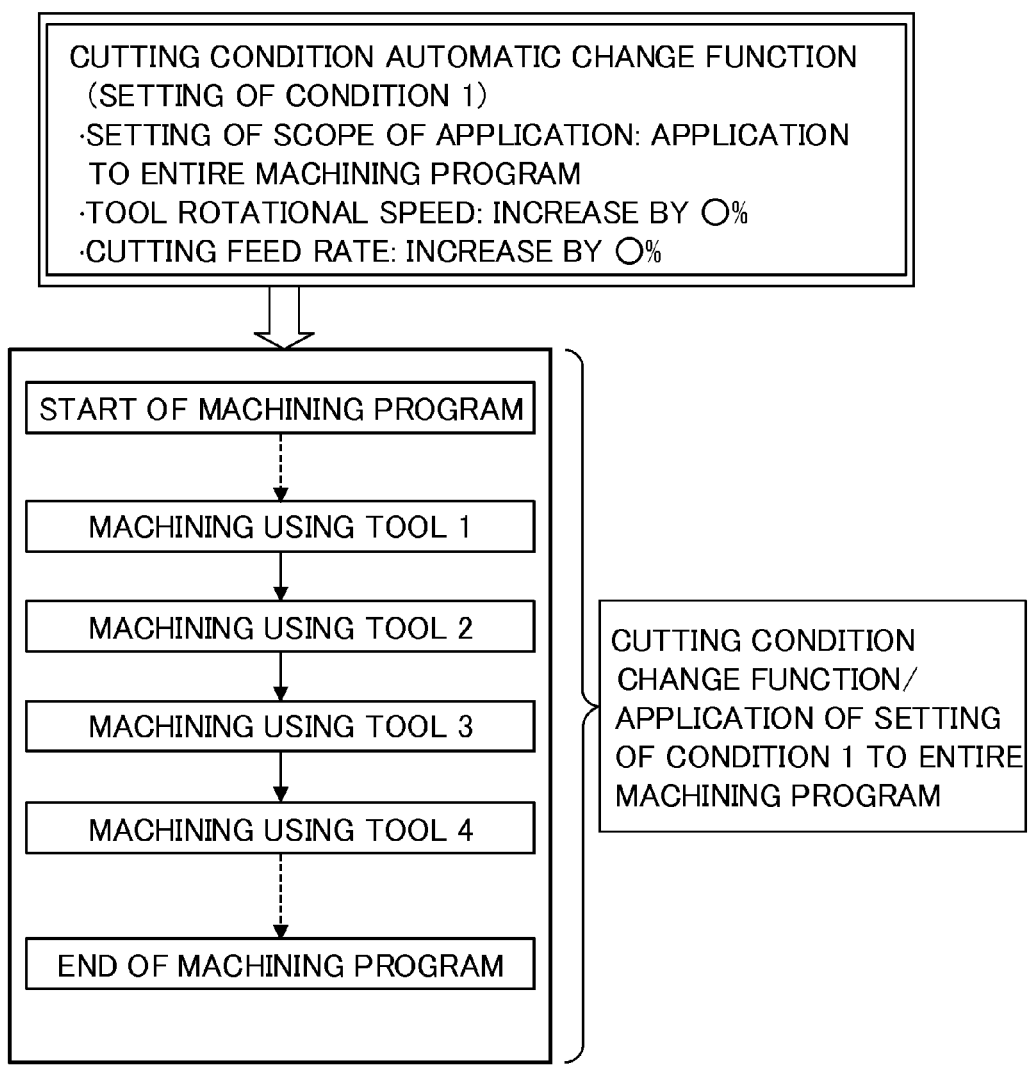
FIG. 4 is a diagram showing an example in which automatic change of the cutting conditions is applied to the entire machining program.

If "(1) Application to entire machining program" in "setting of scope of application" is selected, on the other hand, the change conditions, including the tool rotational speed and the cutting feed rate, are applied to the entire machining program (see FIG. 4).

Figure 5:
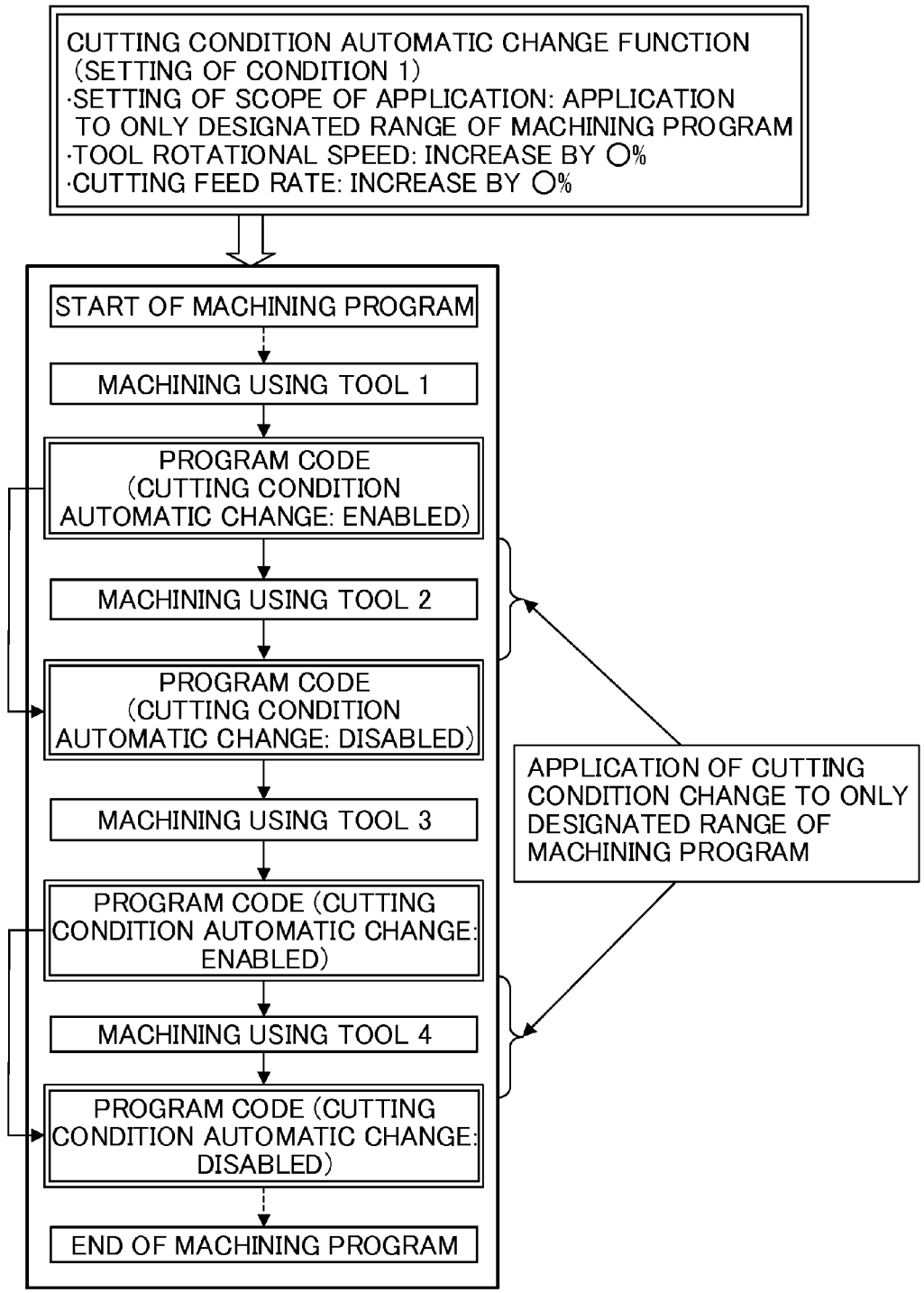
FIG. 5 is a diagram showing an example in which automatic change of the cutting conditions is applied to only a designated area in the machining program.

If "(2) Application to only designated range of machining program" in "setting of scope of application" is selected, moreover, the change conditions, including the tool rotational speed and the cutting feed rate, are applied to only a designated range by adding a program code for designating the range in the machining program or separately providing means for designating the scope of application (see FIG. 5).

Figure 6:
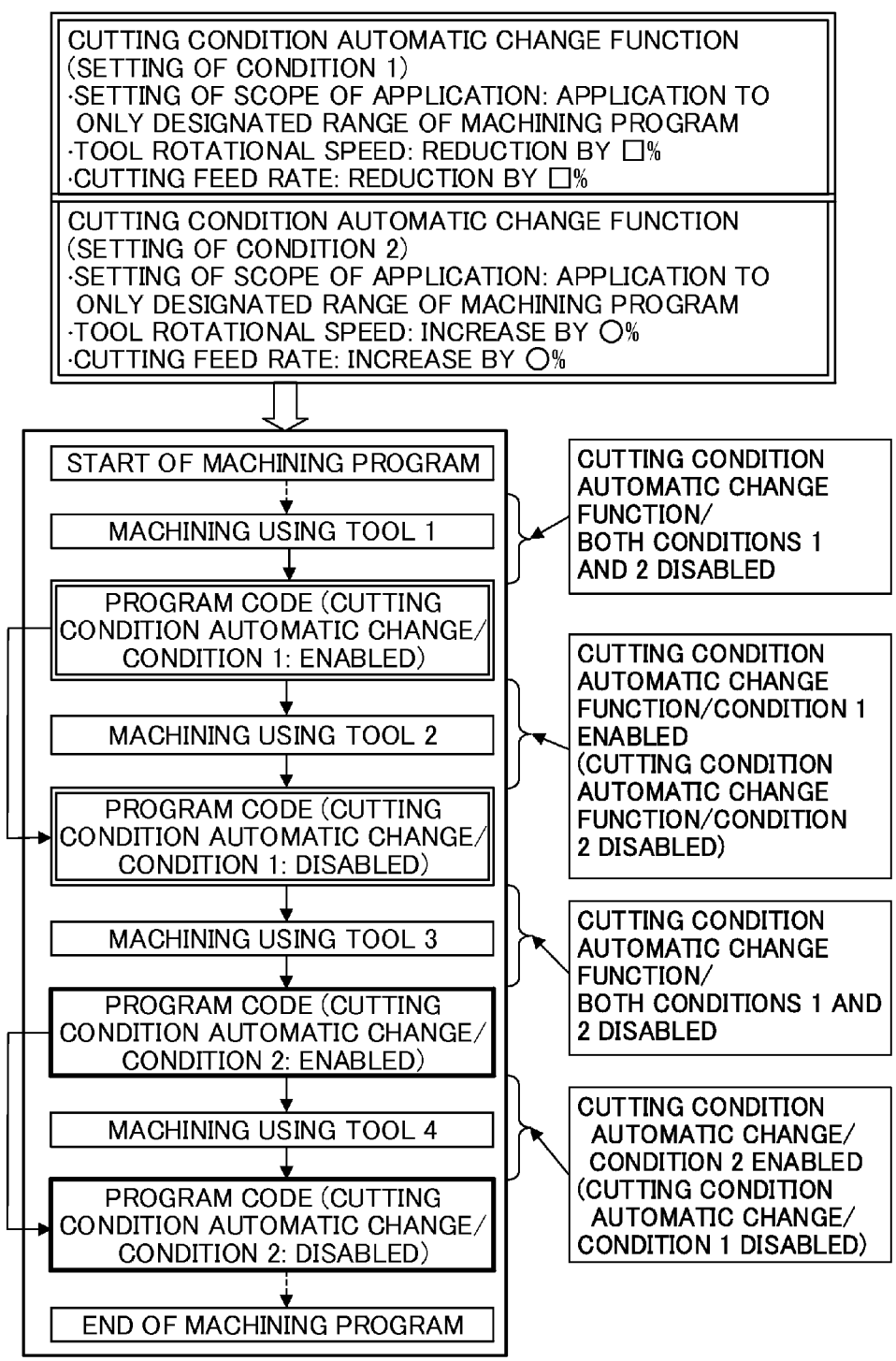
FIG. 6 is a diagram showing an example in which a plurality of set conditions are applied in the machining program.
Figure 7:
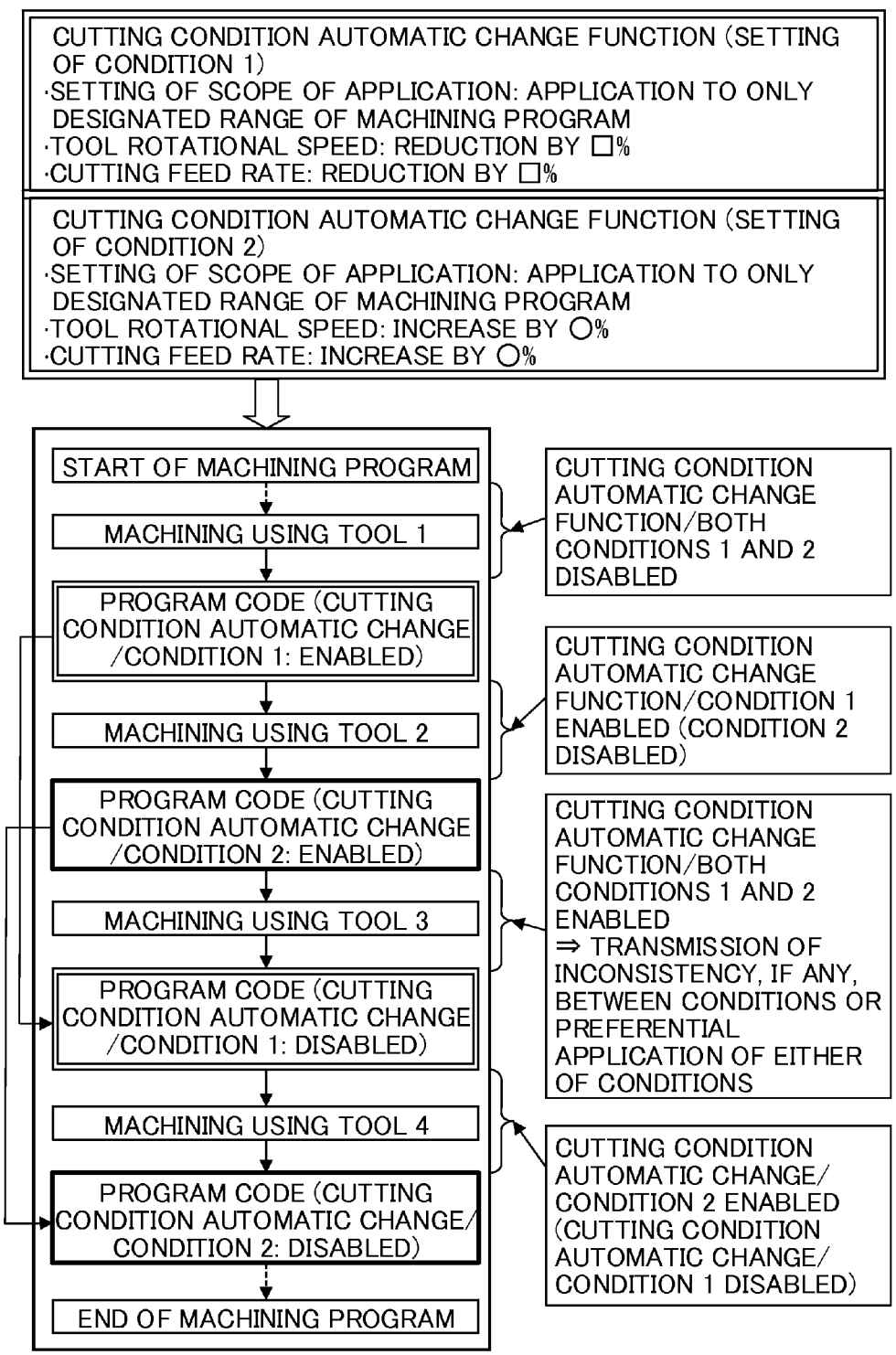
FIG. 7 is a diagram showing another example in which a plurality of set conditions are applied in the machining program.

Furthermore, the cutting condition can be elaborately changed by setting a plurality of conditions and the respective scopes of application of the set conditions, as shown in FIGS. 6 and 7. If the designated conditions are duplicate or inconsistent, however, it is advisable to provide the machine tool with means for issuing a message to that effect or a function of preferentially applying either of the conditions. In some cases, means may be provided for selectively setting the process to be performed.

FIGS. 5 to 7 show examples in which different cutting conditions for various tools are changed. Even in the case of machining using one tool, however, whether change of the cutting conditions is to be applied or not and the contents of the conditions to be changed can be changed. As a result, the following examples are enabled.

(I) If one and the same tool is used for cutting in two different directions or positions, change of the cutting conditions is applied to only the second cycle of machining.

(II) If one and the same tool is used for both rough machining and finish machining, the rough machining is performed according to an initial machining program, and the finish machining is performed with the cutting conditions changed.

If the changed cutting conditions are deviated from appropriate cutting condition ranges in the application examples shown in FIGS. 3 to 7 and all other cases, any of the following functions should be prepared.

(a) The machining program is temporarily stopped and a message to that effect is transmitted.

(b) The change of the machining conditions is suspended and cutting is performed under conditions designated by the original machining program.

(c) Cutting is performed under cutting conditions automatically modified within appropriate ranges.

In some cases, means may be provided for setting one of the processes above (a) to (c) to be performed. If the process (c) is to be performed, automatic modification is carried out in the following procedure based on Cases (1) to (4) below, for example.

Case (1): If the tool rotational speed and/or the cutting feed rate are above an appropriate range,
then the value is automatically modified to a maximum within an appropriate range. However, it is automatically confirmed again, before actual cutting, whether the cutting load is within an appropriate range or not.

Case (2): If the tool rotational speed and/or the cutting feed rate are below an appropriate range,
then the value is automatically modified to a minimum within an appropriate range. However, it is automatically confirmed again, before actual cutting, whether the cutting load is within an appropriate range or not.

Case (3): If the cutting load is above an appropriate range,
then the tool rotational speed is automatically increased and/or the cutting feed rate is automatically reduced. It is automatically confirmed again whether a modified value is within an appropriate range or not.

Case (4): If the cutting load is below an appropriate range,
then the tool rotational speed is automatically reduced and/or the cutting feed rate is automatically increased. It is automatically confirmed again whether a modified value is within an appropriate range or not.

<Procedure 4> Starting of Machining Program

The machine tool starts the machining program in response to execution by the operator or production line manager or an input signal from outside the machine tool. However, if a function is incorporated such that "if the designated conditions are duplicate or inconsistent, a message to that effect is transmitted" or "if the changed cutting conditions are deviated from appropriate cutting condition ranges, the machining program is temporarily stopped and a message to that effect is transmitted", the message may be transmitted before the machining program is started.

<Procedure 5> Application of Cutting Condition Change to Running Machining Program Based on Set Contents The machine tool performs cutting based on application of the cutting condition change to the original machining program according to predetermined conditions.

<Procedure 6> Interruption of Machining Program

The machine tool terminates and interrupts the machining program in response to a command code in the machining program. Depending on the command code in the machining program, cutting of another component may be automatically started.

Figure 8:
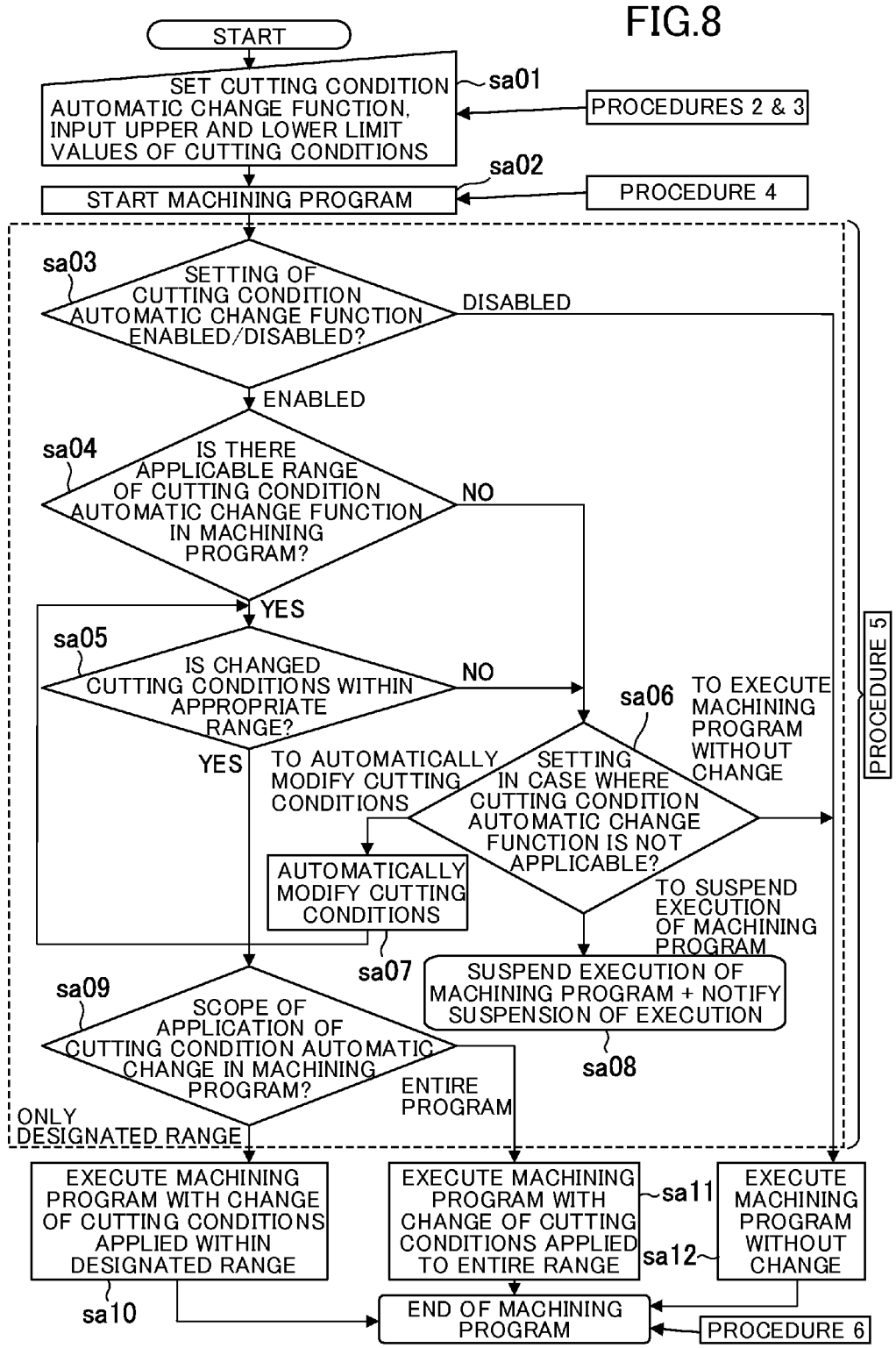
FIG. 8 is a flowchart showing Procedures 2 to 6.

FIG. 8 is a flowchart showing Procedures 2 to 6. Procedures 2 to 6 are not limited to those shown in the flowchart of FIG. 8. In particular, those steps enclosed by a dotted line in the flowchart of FIG. 8 may be performed before the start of the machining program. The following is a sequential description of steps of processing shown in this flowchart.

[Step sa01] The cutting condition automatic change function is set and upper and lower limit values of the cutting conditions are input (Procedures 2 and 3).

[Step sa02] The machining program is started.

[Step sa03] It is determined whether setting of the cutting condition automatic change function is enabled or disabled. If the setting is enabled, the processing proceeds to Step sa04. If the setting is disabled, the processing proceeds to Step sa12.

[Step sa04] It is determined whether or not there is an applicable range of the cutting condition automatic change function in the machining program. If there is the applicable range, the processing proceeds to Step sa05. If not (NO), the processing proceeds to Step sa06.

[Step sa05] It is determined whether or not the changed cutting conditions are within appropriate ranges. If the cutting conditions are within the appropriate ranges, the processing proceeds to Step sa09. If not (NO), the processing proceeds to Step sa06.

[Step sa06] Setting for a case in which the cutting condition automatic change function is not applicable is confirmed. If the cutting conditions are automatically modified, the processing proceeds to Step sa07. If the execution of the machining program is to be suspended, the processing proceeds to Step sa08. If the machining program is to be executed without change, the processing proceeds to Step sa12.

[Step sa07] The cutting conditions are automatically modified, whereupon the processing proceeds to Step sa05.

[Step sa08] The execution of the machining program is suspended and the suspension of the execution is notified.

[Step sa09] It is determined whether the scope of application of the cutting condition automatic change in the machining program covers the entire program or is only a designated range. If the scope of application is only the designated range, the processing proceeds to Step sa10. If the scope of application covers the entire program, the processing proceeds to Step sa11.

[Step sa10] The machining program is executed with the change of the cutting conditions applied within its designated range, whereupon the program ends.

[Step sa11] The machining program is executed with the change of the cutting conditions applied to its entire range, whereupon the program ends. [Step sa12] The machining program is executed without change, whereupon the program ends.

Figure 9:
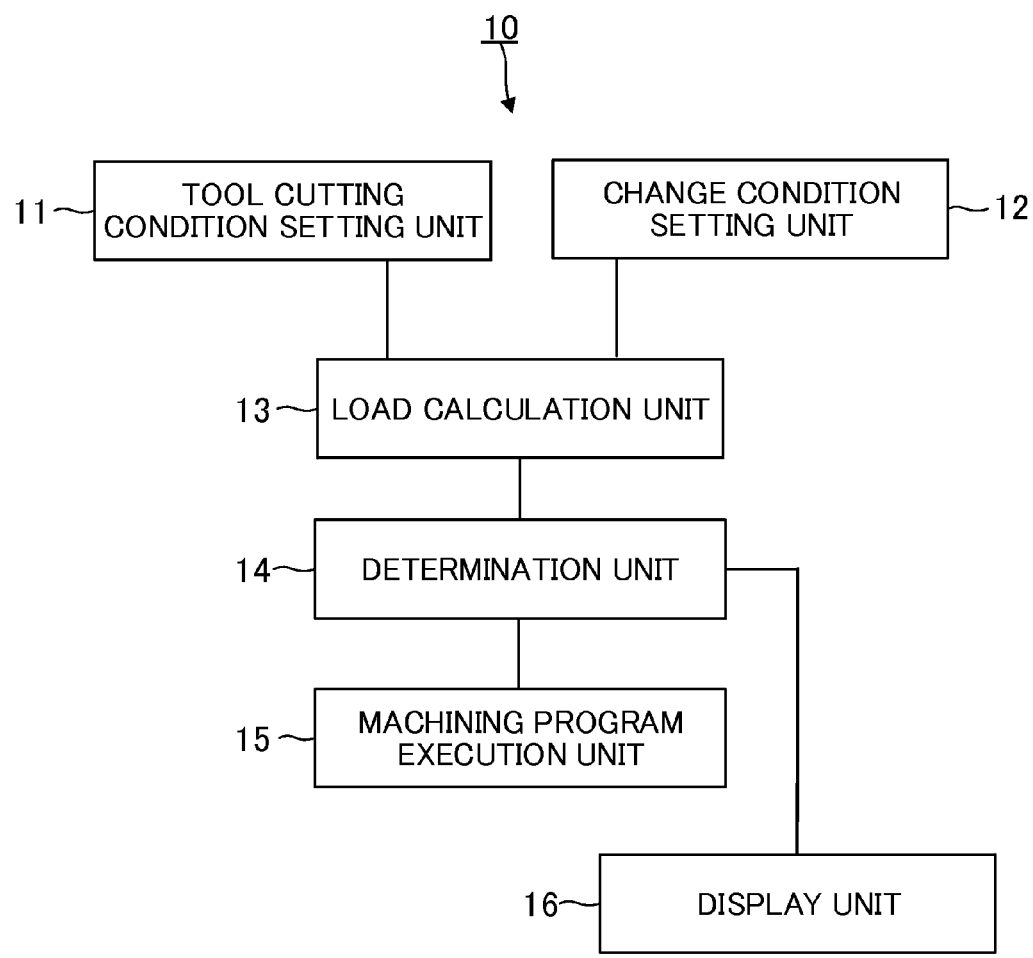
FIG. 9 is a functional block diagram of a controller for controlling a machine tool having a cutting condition change function according to the present invention.

FIG. 9 is a diagram showing a controller for controlling the machine tool having the cutting condition change function according to the present invention.

The machine tool is controlled by a controller 10 to machine a workpiece according to a machining program. The controller 10 comprises a tool cutting condition setting unit 11 configured to set respective upper and lower limit values of a rotational speed, a feed rate, and a cutting load of a tool used in machining, a change condition setting unit 12 configured to set a range and a change condition for a change of the rotational speed and/or the feed rate of the tool in the machining program, a load calculation unit 13 configured to calculate the cutting load from a variation between the cutting condition of the machining program before the change and the cutting condition of the machining program after the change, a determination unit 14 configured to determine whether or not the changed rotational speed and/or feed rate and/or the calculated cutting load are within the ranges of the respective upper and lower limit values of the rotational speed, the feed rate, and the cutting load set by the tool cutting condition setting unit, a machining program execution unit 15 configured to execute the machining program if it is determined by the determination unit 14 that the changed rotational speed or feed rate and the calculated cutting load are within the ranges of the respective upper and lower limit values of the rotational speed, the feed rate, and the cutting load set by the tool cutting condition setting unit, and a display unit 16 configured to display the result of the determination by the determination unit 14.

According to the present invention, there can be provided a controller for controlling a machine tool having a function of automatically changing cutting conditions. Specifically, according to the present invention, the following requests from or problems with an operator or production line manager can be resolved.

(1) If the cycle time is long enough, the cutting conditions are lowered within appropriate ranges so that the load on the cutting tool is reduced to improve the service life of the tool (extension of tool life).

(2) If the cutting conditions are not yet critical, they are raised within the appropriate ranges to reduce the cycle time.

(3) Fine adjustment of the machining program to resolve the request or problem described in the item (1) or (2) above is simplified and the changed cutting conditions are maintained within the appropriate ranges.

The invention claimed is:

1. A controller for controlling a machine tool to machine a workpiece according to a machining program, the controller comprising a processor configured to:
set respective upper and lower limit values of a rotational speed, a feed rate, and a cutting load of a tool for machining,
set a range and condition for a change of the rotational speed and/or the feed rate of the tool in the machining program,
calculate the cutting load from a variation between the cutting condition of the machining program before the change and the cutting condition of the machining program after the change, and
determine whether or not at least one of the changed rotational speed, changed feed rate and calculated cutting load is within ranges of the respective upper and lower limit values of the rotational speed, the feed rate, and the cutting load,
wherein, in response to a determination that the changed rotational speed or changed feed rate of the tool and the calculated cutting load are within the ranges of the respective upper and lower limit values of the rotational speed, the feed rate, and the cutting load,
the processor is further configured to control the machine tool to machine the workpiece with the tool, according to the machining program and the changed rotational speed or changed feed rate of the tool.

2. The controller according to claim 1, further comprising; a display unit configured to display a result of the determination by the processor.

3. The controller according to claim 1, wherein the processor is further configured to change the rotational speed and/or the feed rate only in a designated area in the machining program.

4. The controller according to claim 1, wherein the processor is further configured to apply different set conditions to different tools in the machining program, and
each set condition among the different set conditions includes
a change of the rotational speed and/or the feed rate for a corresponding tool among the plurality of different tools, and
a scope of application of the change to the entire machining program or to a designated area in the machining program.

5. The controller according to claim 1, wherein in response to a determination that the changed rotational speed or changed feed rate of the tool and the calculated cutting load are not within the ranges of the respective upper and lower limit values of the rotational speed, the feed rate, and the cutting load, the processor is further configured to automatically modify the changed rotational speed or changed feed rate to be within the ranges of the respective upper and lower limit values of the rotational speed or feed rate.

6. The controller according to claim 1, wherein
in response to a determination that the changed rotational speed or changed feed rate of the tool and the calculated cutting load are not within the ranges of the respective upper and lower limit values of the rotational speed, the feed rate, and the cutting load,
the processor is further configured to suspend execution of the machining program and perform a notification of the suspension of execution of the machining program.

7. The controller according to claim 1, wherein
in response to a determination that the changed rotational speed or changed feed rate of the tool and the calculated cutting load are not within the ranges of the respective upper and lower limit values of the rotational speed, the feed rate, and the cutting load,
the processor is further configured to execute the machining program without the change to the rotational speed and/or the feed rate.

* * * * *